No. 889,437. PATENTED JUNE 2, 1908.
C. F. CALLAHAN.
POWER DRUM GEARING.
APPLICATION FILED JAN. 16, 1908.
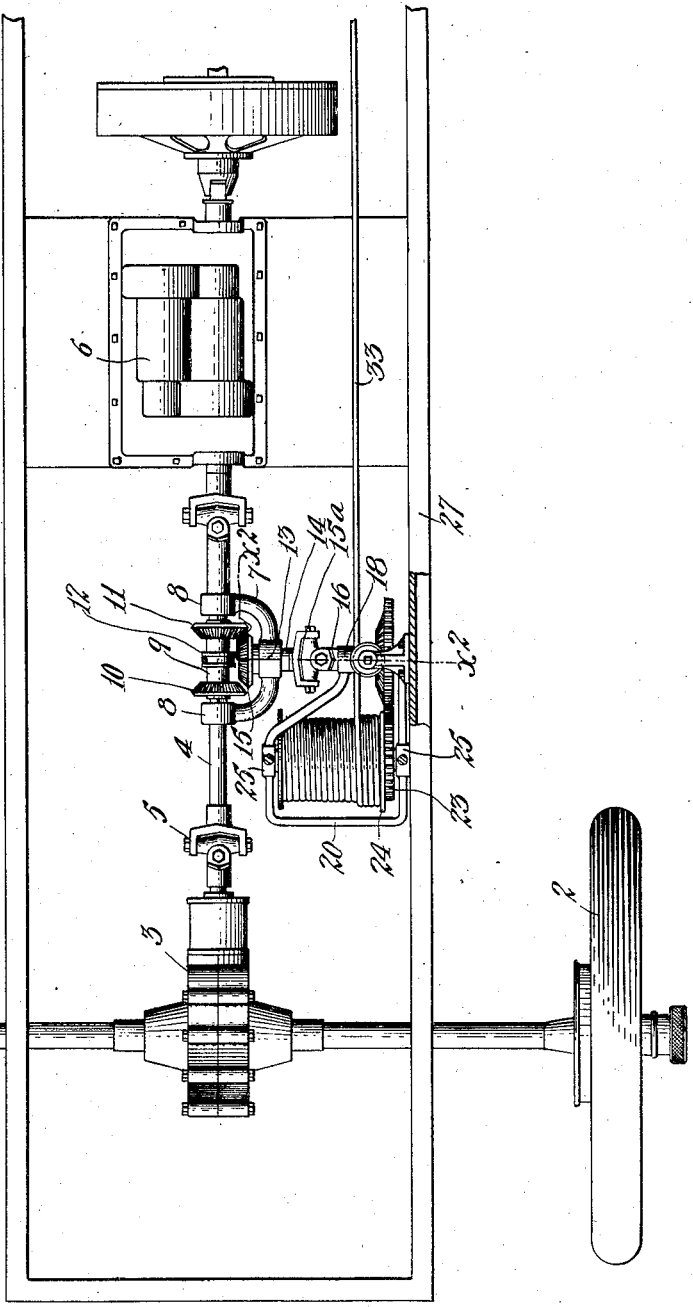

UNITED STATES PATENT OFFICE.

CHARLES F. CALLAHAN, OF PASADENA, CALIFORNIA.

POWER-DRUM GEARING.

No. 889,437.   Specification of Letters Patent.   Patented June 2, 1908.

Application filed January 16, 1908. Serial No. 411,171.

*To all whom it may concern:*

Be it known that I, CHARLES F. CALLAHAN, a citizen of the United States, residing at Pasadena, in the county of Los Angeles and State of California, have invented a new and useful Power-Drum Gearing, of which the following is a specification.

This invention relates to a power drum gearing designed for use on automobiles, whereby if the automobile becomes stalled, by reason of muddy or sandy roads, or in crossing water, the power drum gearing may be placed in gear with the engine of the automobile and the engine operated to drive the power drum and wind up a cable thereon, the end of the cable having been attached to some stationary point, whereby the automobile may be extricated from its stalled position without necessarily depending upon the traction of the wheels of the automobile.

A further object of the invention is to provide for driving the wheels of the automobile simultaneously with the power drum gearing, if desired, to augment the power drum gearing and assist in moving the automobile from its stalled position.

Another object is to enable the power drum gearing to be operated by hand, if desired, without the driver getting off from the car, which is a particularly advantageous feature when the automobile is stalled in mud or water.

The accompanying drawings illustrate the invention, and referring thereto:—Figure 1 is a plan view of the rear portion of a chassis, showing the frame of the automobile, rear wheels and axle, propeller shaft, regular transmission gearing case, and illustrates the application of the power drum gearing adapted to be geared with the propeller shaft. Fig. 2 is a transverse sectional view on line $x^2$—$x^2$ Fig. 1, showing the bevel gear of the power drum and hand operated pinion in elevation.

1 designates the rear axle having rear wheels 2 and differential gear casing 3, and extending forwardly from the differential gear casing 3 is a propeller shaft 4, provided with the usual universal joints 5, its forward end extending into the regular transmission gearing case 6.

A yoke 7 is provided and has journal bearings 8 through which the propeller shaft 4 extends, and that portion of the propeller shaft 4 which lies between the journal bearings 8 is squared, as indicated, and slidably mounted on the squared portion is a sleeve 9, the bore of which is squared to fit the propeller shaft, which sleeve is provided with bevel gears 10 and 11 at each end. The sleeve 9 is also provided with a grooved collar 12 which may be engaged by a forked lever, not shown, for sliding the sleeve 9 in either direction on the propeller shaft. The yoke 7 also has a central journal bearing 13 in which is journaled a short shaft 14 which at one end carries a bevel gear 15, and by sliding the sleeve 9 in one direction or the other either the gear 10 or gear 11 may be moved into mesh with the gear 15 to impart rotation to the shaft 14, while when the sleeve 9 stands in a central position, both gears 10 and 11 are out of mesh with gear 15. The shaft 14 is connected by a universal joint 15ª with a squared shaft 16 which is slidably mounted in an internally squared shaft 17, the shaft 17 being journaled in bearings 18 and 19 formed on a frame 20. Mounted on the shaft 17 is a spur gear 21 and a bevel gear 22. The spur gear 21 is permanently in mesh with a spur gear 23 mounted at one end of a drum 24, the drum 24 being journaled in bearings 25 in the frame 20. A journal bearing 26 is attached to the side frame 27 of the automobile and mounted therein is a vertical shaft 28 the lower end of which carries a bevel pinion 29 which meshes with the bevel gear 22. The upper end of the shaft 28 lies flush with the deck or floor 30 of the automobile and is squared to receive the socket end 31 of a crank 32, which crank may be readily applied to the shaft 28 when it is desired to operate the same manually. A cable 33 may be carried while wound on the drum 24, or it may be carried in the automobile and wound on the drum 24 when it is necessary to use it.

In operation, when the automobile becomes stalled, the front end of the cable 33 is carried forward and attached to some fixed object and its rear end being wound on the drum, by rotating the drum, the automobile may be drawn forward to extricate it. This may be accomplished by operating the handle 32 to rotate pinion 29 which drives gear 22, thus imparting rotation to gear 21, and the latter driving drum 24 through the medium of gear 23, the sleeve 9 standing in central position.

Preferably the power drum is driven by the engine by shifting sleeve 9 to engage either of gears 10 or 11 with gear 15, according to the direction in which the drum is to be driven, whereupon the rotation of the propeller shaft 4 imparts rotation to shaft 14, and the latter driving shaft 16 imparts, through the medium of shaft 17, rotation to gears 21 and 23, thus rotating drum 24. During this operation it will be noted that as the propeller shaft rotates it also furnishes power to the rear wheels 2 thus assisting in extricating the automobile even though the wheels 2 are driven at a faster speed than the power drum gearing operates, as the latter is geared much lower than the wheels 2. But this faster rotation of the wheels 2 is in many cases of material assistance when acting conjointly with the power drum gearing.

In the ordinary running of the automobile, the sleeve is set in central position so that no motion is imparted to the power drum gearing, and by employing the two gears 10 and 11 it is possible to operate the power drum gearing in either direction, thus enabling the cable 33 to be wound either way around the drum 24 or to pull the automobile in either direction. The universal joint 15ª and sliding shaft 16 permit the necessary play of the yoke 7 as the propeller shaft 5 swings slightly in running due to the differential vertical movement between the transmission case 6 and the rear axle 1.

What I claim is:—

1. In combination with the propeller shaft, a drum mounted transversely thereof, a gear at one end of the drum, a sleeve slidable on the propeller shaft, a pair of bevel gears on said sleeve, a yoke pivotally supported on the propeller shaft, a shaft journaled in said yoke, a gear on the latter shaft adapted to be engaged by either of said first named bevel gears, another shaft connected by a universal joint with the latter shaft, a rotating sleeve in which the last named shaft is slidably mounted, and a spur gear on said rotating sleeve meshing with the gear on said drum.

2. In combination with the propeller shaft, a drum mounted transversely thereof, a gear at one end of the drum, a sleeve slidable on the propeller shaft, a pair of bevel gears on said sleeve, a yoke pivotally supported on the propeller shaft, a shaft journaled in said yoke, a gear on the latter shaft adapted to be engaged by either of said first named bevel gears, another shaft connected by a universal joint with the latter shaft, a rotating sleeve in which the last named shaft is slidably mounted, a spur gear on said rotating sleeve meshing with the gear on said drum, a bevel gear on said rotating sleeve, a pinion meshing with the last named bevel gear, and a vertical shaft extending to the deck of the automobile and supporting said pinion and adapted to receive crank means above the deck of the car in its upper end for rotating it.

In testimony whereof, I have hereunto set my hand at Los Angeles California this 8th day of January 1908.

CHARLES F. CALLAHAN.

In presence of—
 GEORGE T. HACKLEY,
 FRANK L. A. GRAHAM.